US011193013B2

(12) United States Patent
Teansawang et al.

(10) Patent No.: US 11,193,013 B2
(45) Date of Patent: Dec. 7, 2021

(54) POLYMER COMPOSITION (71) Applicant: SCG Chemicals Co., Ltd., Bangkok (TH)

(72) Inventors: Renuka Teansawang, Bangkok (TH); Wantinee Viratyaporn, Bangkok (TH); Anchalee Wongariyakawee, Bangkok (TH)

(73) Assignee: SCG Chemicals Co., Ltd., Bangkok (TH)

( * ) Notice: Subject to any disclaimer, the term of this patent is extended or adjusted under 35 U.S.C. 154(b) by 77 days.

(21) Appl. No.: 16/468,329

(22) PCT Filed: Oct. 19, 2017

(86) PCT No.: PCT/EP2017/076758
§ 371 (c)(1),
(2) Date: Jun. 11, 2019

(87) PCT Pub. No.: WO2018/108362
PCT Pub. Date: Jun. 21, 2018

(65) Prior Publication Data
US 2019/0300692 A1 Oct. 3, 2019

(30) Foreign Application Priority Data
Dec. 12, 2016 (EP) .................................. 16203416

(51) Int. Cl.
| C08L 27/06 | (2006.01) |
| C08K 3/22 | (2006.01) |
| C08K 5/00 | (2006.01) |
| C08K 5/053 | (2006.01) |
| C08K 5/09 | (2006.01) |
| C08K 5/521 | (2006.01) |
| C08K 5/5419 | (2006.01) |
| C08K 5/098 | (2006.01) |
| C08K 3/30 | (2006.01) |
| C08K 9/04 | (2006.01) |
| H01B 3/44 | (2006.01) |
| C08K 5/12 | (2006.01) |
| H01B 7/295 | (2006.01) |
| C08K 3/32 | (2006.01) |

(52) U.S. Cl.
CPC .............. C08L 27/06 (2013.01); C08K 3/22 (2013.01); C08K 3/30 (2013.01); C08K 3/32 (2013.01); C08K 5/005 (2013.01); C08K 5/0016 (2013.01); C08K 5/053 (2013.01); C08K 5/09 (2013.01); C08K 5/098 (2013.01); C08K 5/12 (2013.01); C08K 5/521 (2013.01); C08K 5/5419 (2013.01); C08K 9/04 (2013.01); H01B 3/443 (2013.01); H01B 7/295 (2013.01); C08K 2003/2217 (2013.01); C08K 2003/2227 (2013.01); C08K 2003/2231 (2013.01); C08K 2003/2296 (2013.01); C08L 2203/202 (2013.01)

(58) Field of Classification Search
CPC ..... C08L 27/06; C08L 2203/202; C08K 3/22; C08K 3/30; C08K 3/332; C08K 5/0016; C08K 5/005; C08K 5/053; C08K 5/09; C08K 5/098; C08K 5/12; C08K 5/521; C08K 5/5419; C08K 9/04; C08K 2003/2217; C08K 2003/2227; C08K 2003/2231; C08K 2003/2296; C08K 3/32; C08K 5/10016; H01B 3/443; H01B 7/295
USPC ....................................................... 524/431
See application file for complete search history.

(56) References Cited

U.S. PATENT DOCUMENTS 8,247,475 B2 * 8/2012 Kobayashi .............. C01F 7/005
523/200

FOREIGN PATENT DOCUMENTS

| CN | 103980637 A | 8/2014 | |
| DE | 19836580 A1 * | 2/2000 | .............. C08K 9/04 |
| EP | 3026679 A1 | 6/2016 | |
| JP | 06080849 A * | 3/1994 | |
| JP | 06271730 A * | 9/1994 | |
| WO | 2007065861 A1 | 6/2007 | |
| WO | 2009080597 A2 | 7/2009 | |
| WO | 2013117957 A2 | 8/2013 | |
| WO | 2015144778 A1 | 10/2015 | |

OTHER PUBLICATIONS

JP 06-080849 A, machine translation, JPO Japan Platform for Patent Information (J-PlatPat). (Year: 1994).*
JP 06-271730 A, machine translation, JPO Japan Platform for Patent Information (J-PlatPat). (Year: 1994).*
DE 19836580 A1, machine translation, EPO espacenet. (Year: 2000).*
Nov. 28, 2011, Zheng Xiaoran, Cusack Paul, "Tin-containing layered double hydroxides: Synthesis and application in poly(vinyl chloride) cable formulations", Fire and Materials, vol. 37, No. 1, pp. 35-45, XP002770895.
Jan. 29, 2015, Labuschagne Johan et al., "Heat stabilising flexible PVC with layered double hydroxide derivatives", Polymer Degradation and Stability, vol. 113, pp. 46-54, XP029153947.

(Continued)

Primary Examiner — Josephine L Chang
(74) Attorney, Agent, or Firm — Banner & Witcoff, Ltd.

(57) ABSTRACT

The present invention relates to polymer composition comprising 100 parts by weight of halogen containing polymer, 10 to 70 parts by weight of plasticizer, 2 to 10 parts by weight of stabilizer, 1-15 parts by weight of a layered double hydroxide (LDH) having the formula (I) wherein M and M' are different and each is at least one metal cation, z=1 or 2; y=3 or 4, 0<x<0.9, b=0 to 10, c=0 to 10, X is an anion, n is the charge on the anion, and a=z(1−x)+xy−2; solvent is organic solvent with a hydrogen bond donor or acceptor function; as well as an article comprising the polymer composition.

$$[M^{z+}{}_{1-x}M'^{y+}{}_x(OH)_2]^{a+}(X^{n-})_{a/n}\cdot bH_2O\cdot c(\text{solvent}) \qquad (I)$$

17 Claims, 2 Drawing Sheets (56) References Cited

OTHER PUBLICATIONS

May 1, 2010, Gu Zheng, Liu Weisheng, Dou Wei, Tang Fei, "Preparation of a Novel Heat Stabilizer for Poly(vinyl chloride)-Zn, Mg, Al-Layered Double Hydroxide", Polymer Composites, vol. 31, No. 5, pp. 928-932, XP002770896.
Aug. 13, 2014, WPI Database, Week 201471, Thomson Scientific, London, GB, XP002776547.
Nov. 11, 2010, Wang et al., "High temperature adsorption of $CO_2$ on Mg—Al hydrotalcite: Effect of the charge compensating anions and the sythesis pH", Catalysis Today, vol. 164, p. 198.
Jan. 2, 2018, International Search Report and Written Opinion, PCT/EP2017/076758.

\* cited by examiner

POLYMER COMPOSITION

CROSS-REFERENCE TO RELATED APPLICATIONS

This application is a U.S. National Stage application under 35 U.S.C. § 371 of International Application PCT/EP2017/076758 (published as WO 2018/108362 A1), filed Oct. 19, 2017 which claims the benefit of priority to Application EP 16203416.9 filed Dec. 12, 2016. Benefit of the filing date of each of these prior applications is hereby claimed. Each of these prior applications is hereby incorporated by reference in its entirety.

The present invention relates to a polymer composition with flame retardant properties, to an electrical wire or cable coated with the polymer composition, and to an article comprising the polymer composition.

Flame retardant behavior is crucial for various applications, especially in wire and cable industry. The fire behavior of a material includes ease of thermal degradation, ease of ignition, flame spread, rate of heat release, and ease of extinction which may be complicated by smoke generation, toxic potency and other properties. A higher rate of heat release causes fast ignition and flame spread. Furthermore, the rate of heat release controls the fire intensity and is therefore much more important than ignitability, smoke toxicity or flame spread. Typically, when flame retardants are used to address these fire risks, they are specifically tailored to meet a respective fire risk scenario.

Halogen containing polymer, such as polyvinyl chloride, is considered as a self-extinguishing material due to its chemical composition with halogen atoms. However, when plasticizers are added to soften the material, the flame retardant ability is significantly reduced and the flame retardant additives are required to provide slow flame propagation. Especially flame retardancy of polymer compositions containing a chlorine containing polymer is crucial due to the toxic gases which may be otherwise released upon ignition. In the art, typically antimony trioxide may be used working synergistically with halogen-containing material, such as PVC. However, in commercial products only a small loading of antimony trioxide is added due to its high price. Therefore, other mineral flame retardant such as metal oxide is usually required at high loading to achieve good flame retardancy. Such high filler/additive loading deteriorates mechanical properties, i.e. tensile strength and elongation at break. Besides flame retardancy of a polymer composition containing a flame retardant, also color stability of the polymer composition, after extrusion, is an essential requirement.

The flame retardants of the art, such as magnesium dihydroxide (MDH) or aluminium trihydrate (ATH), have the further disadvantages in that these hydrophilic compounds are less incompatible with polymers, and require extra additives to get compounded with the polymers.

Typically, high loads are always required to get necessary flame retardancy performance which can affect the mechanical properties of the composites, and show a poor dispersion in the polymer. In addition, the flame retardants are chemically non-flexible, only perform endothermic reaction to generate water.

More recently, the use of hydrotalcites or layered double hydroxides (LDHs) in the synthesis of inorganic/organic nanocomposites has become a new emerging class of material.

Layered double hydroxides are a class of compounds which comprise at least two metal cations and have a layered structure. A review of LDHs is provided in *Structure and Bonding*; Vol 119, 2005 *Layered Double Hydroxides* ed. X Duan and D. G. Evans. The hydrotalcites, perhaps the most well-known examples of LDHs, have been studied for many years. LDHs can intercalate anions between the layers of the structure.

Owing to the relatively high surface charge and hydrophilic properties of LDHs, the particles or crystallites of conventionally synthesised LDHs are generally highly aggregated. The result of this is that, when produced, LDHs aggregate to form "stone-like", non-porous bodies with large particle sizes of up to several hundred microns and low specific surface area of generally 5 to 15 $m^2/g$ (as disclosed for example in Wang et al Catal. Today 2011, 164, 198). These make LDHs not only be difficult to form LDH polymer composite but also have poor dispersion in polymer which would lead to poor mechanical properties.

There have been attempts to modify LDHs to enable stable dispersions or good composites to be formed. WO 2009/080597A2 discloses a process for preparing an organically modified layered double hydroxide with a reduced alkalinity and agglomerate formation. WO 2007/065861 A relates to LDHs having fatty acid anions intercalated therein to promote compatibility with polymers. But these organo-modified LDH materials often decompose at a relative low temperature and require appropriate and expensive treatment of the LDH prior to their incorporation into polymer matrix. WO 2013/117957 A2 discloses the use of LDHs as flame retardants in a LDH polymer composite through solvent mixing method for reduced flammability and smoke index. However, the solvent mixing method is not practically in the industry.

It is an object of the present invention to provide a polymer composition having improved flame retardancy, although miner amounts of flame retardant are added, as well as preferably an improved color stability over time, especially through melt mixing process.

This object is achieved by a polymer composition comprising 100 parts by weight of halogen containing polymer, 10 to 70 parts by weight of plasticizer, 2 to 10 parts by weight of stabilizer, 1-15 parts by weight of a layered double hydroxide (LDH) having the formula

$$[M^{2+}_{1-x}M'^{y+}_{x}(OH)_2]^{a+}(X^{n-})_{a/n}.bH_2O.c(\text{solvent}) \quad (I)$$

wherein M and M' are different and each is at least one metal cation, z=1 or 2; y=3 or 4, 0<x<0.9, b=0 to 10, c=0 to 10, X is anion, n is the charge on the anion, and a z(1−x)+xy−2; solvent is organic solvent with a hydrogen bond donor or acceptor function.

In one embodiment, in formula (I), when z is 2, M is Mg, Zn, Fe, Ca, Sn, Ni or a mixture of two or more of these, or, when z is 1, M is Li.

In a further embodiment, in formula (I), when y is 3, M' is Al, Ga, Y, In, Fe, Ti, or a mixture thereof, or when y is 4, M' is Sn, Ti or Zr or a mixture thereof.

In one embodiment, the LDH has the formula wherein p+q+r=1, p=0-1, q=0-1, r=0-1, s+t=1, s=0-1, t=0-1, x=0.10-0.40, b=0 to 10, c=0 to 1, X is an anion, n is the charge on the anion, and a=[(2p+2q+2R)(1−x)]+[(3s+4t)x]−2; solvent is organic solvent with a hydrogen bond donor or acceptor function.

In another embodiment, the LDH has the formula wherein p+q=1, p=0-1, q=0-1, x=0.10-0.40, b=0 to 10, c=0 to 1, X is an inorganic oxyanion, n is the charge on the anion, and a=[(2p+2q)(1−x)]+3x−2; solvent is ethanol.

In one embodiment, in LDH formula, x is preferably 0.10-0.33, more preferably 0.25-0.33; b is preferably 0.1-1, more preferably 0.1-0.6; c is preferably 0-0.01, more preferably 0-0.0001, most preferably 0-0.000005; p is preferably 0-0.67, more preferably 0-0.33; q is preferably 0.33-1, more preferably 0.67-1; r is preferably 0.33-1, more preferably 0.67-1; s is preferably 0.33-1, more preferably 0.7-1; t is preferably 0-0.67, more preferably 0-0.3.

In another embodiment, the amount of solvent in LDH is in a range of 0-5,000 mg/kg of total mass of LDH, preferably 0-50 mg/kg of total mass of LDH, more preferably 0-10 mg/kg of total mass of LDH.

In another embodiment, X is an anion selected from at least one of halide, inorganic oxyanion, anionic surfactants, anionic chromophores and anionic UV absorbers, wherein the inorganic oxyanion is preferably carbonate, bicarbonate, hydrogenphosphate, dihydrogenphosphate, nitrite, borate, nitrate, sulphate, phosphate or a mixture of two or more thereof.

The anion in the LDH may be otherwise any appropriate anion, organic or inorganic, for example halide (e.g., chloride, bromide), inorganic oxyanions (e.g. $X_mO_n(OH)_p^{-q}$; m=1-5; n=2-10; p=0-4, q=1-5; X=B, C, N, S, P: e.g. carbonate, bicarbonate, hydrogenphosphate, dihydrogenphosphate, nitrite, borate, nitrate, phosphate, sulphate), anionic surfactants (such as sodium dodecyl sulfate, fatty acid salts or sodium stearate), anionic chromophores, and/or anionic UV absorbers, for example 4-hydroxy-3-10 methoxybenzoic acid, 2-hydroxy-4 methoxybenzophenone-5-sulfonic acid (HMBA), 4-hydroxy-3-methoxy-cinnamic acid, p-aminobenzoic acid and/or urocanic acid.

The organic solvent with a hydrogen bond donor or acceptor function is, in any amount, miscible with water. Hydrogen bond donor groups may include R—OH, R—NH$_2$, R$_2$NH, whereas hydrogen bond acceptor groups may include ROR, R$_2$C=O, RNO$_2$, R$_2$NO, R$_3$N, ROH, RCF$_3$ [R is hydrocarbyl group]. Exemplary organic solvents include ethyl acetate, acetone, acetonitrile, dimethylformamide, dimethylsulfoxide, dioxane, ethanol, m-cresol, o-cresol, p-cresol, methanol, n-propanol, isopropanol, n-butanol, sec-butanol, n-pentanol, n-hexanol, cyclohexanol, diethyl ether, diisopropyl ether, di-n-butyl ether, methyl tert-butyl ether (MTBE), tert-amyl methyl ether, cyclopentyl methyl ether, anisole, butyl carbitol acetate, cyclohexanone, methyl ethyl ketone (MEK), methyl isobutyl ketone (MIBK), methyl isoamyl ketone, methyl n-amyl ketone, isophorone, isobutyraldehyde, feral, methyl formate, methyl acetate, isopropyl acetate, n-propyl acetate, isobutyl acetate, n-butyl acetate, n-amyl acetate, n-hexyl acetate, methyl amyl acetate, methoxypropyl acetate, 2-ethoxyethyl acetate, 2-butoxyethyl acetate, n-butyl propionate, n-pentyl propionate, triethylamine, 2-nitropropane, aniline, N,N-dimethylaniline, nitromethane, tetrahydrofurane, and mixtures of two or more thereof. Preferably, the solvent is ethanol or acetone.

In one embodiment, the LDH has a volatile content which is presented as b+c in the range of 0-1, preferably 0-0.6. The volatile content refers to the amount of volatile substance where the volatile substance are water, solvent or a mixture thereof. The volatile content is measured by Karl fisher titration technique for water content and gas chromatography/mass spectrometry GC/MS headspace technique for solvent content.

Halogen containing polymers are homopolymers or copolymers containing halogen, preferably, chlorine containing polymer. Chlorine containing polymer includes polyvinyl chloride, polyvinylidene chloride, ethylene-vinyl chloride copolymer, vinyl chloride-propylene copolymer, chlorinated polyethylene, chlorinated polypropylene, chlorinated butyl rubber, chlorosulfonated polyethylenes, and the like. In a more preferred embodiment, the chlorine containing polymer is polyvinyl chloride.

In one embodiment, the LDH is present in the polymer composition in the range of 3 to 10 parts by weight per 100 parts by weight of the halogen containing polymer.

In a further embodiment, a particle size distribution of the LDH is in the range of 0.05-5 µm, preferably in the range of 0.1 to 3 µm. The particle size distribution is measured by laser diffraction particle size analysis technique.

In a further embodiment, the LDH has a specifics ace area in the range of 50 to 500 m$^2$/g, preferable in the range of 80 to 100 m$^2$/g. The specific surface area is measured by Brunauer Emmett-Teller (BET) analysis technique.

In another embodiment, the plasticizer comprises at least one plasticizer selected from the group of phthalate, mellitate, adipate, azelate, maleate, sebacate, epoxidized oil, chlorinated paraffin oil, polymeric plasticizer or a mixture thereof. Preferably, the mixtures of phthalate and mellitate. Exemplary plasticizers include bis(2-ethylhexyl) phthalate (DEHP), bis(2-propylheptyl) phthalate (DPHP), diisononyl phthalate (DINP), di-n-butyl phthalate (DBP), butyl benzyl phthalate (BBzP), diisodecyl phthalate (DIDP), dioctyl phthalate (DOP), diisooctyl phthalate (DIOP), diethyl phthalate (DEP), diisobutyl phthalate (DIBP), di-n-hexyl phthalate, trimethyl trimellitate (TMTM), tri-(2-ethylhexyl) trimellitate (TEHTM), tri-(n-octyl,n-decyl) trimellitate, tri-(heptyl,nonyl) trimellitate, n-octyl trimellitate (OTM), bis (2-ethylhexyl)adipate (DEHA), dimethyl adipate (DMAD), Monomethyl adipate (MMAD), di-octyl adipate (DOA), dibutyl sebacate (DBS), dibutyl maleate (DBM), diisobutyl maleate (DIBM), polyester plasticizer, and mixtures of two or more thereof.

In a further embodiment, the stabilizer comprises at least one stabilizer selected from the group of lead-based stabilizer, mixed metal-based stabilizer or a mixture thereof, preferably lead-based stabilizer. Exemplary lead-based stabilizer include tetra-basic lead sulphate, tri-basic lead sulphate, di-basic lead phosphite, di-basic lead phthalate, di-basic lead stearate, normal lead stearate, calcium-zinc stabilizers, barium-zinc stabilizers, calcium-barium-zinc stabilizers and mixtures of two or more thereof.

The plasticizer included in the polymer composition is for increase of the plasticity or for reducing the viscosity of the polymer composition. The plasticizer also lowers the glass temperature of the polymer. Thus, the polymer is easier to process when adding the plasticizer. In addition, the plasticizer may make rigid polymer to be soft polymer, for example PVC, which is useful for making wire and cable sheaths.

The stabilizer is included in the polymer composition for stabilizing the polymer composition during and after processing at high temperature and under high pressure. Without a stabilizer, the polymer will easily degrade/discolor.

In further embodiment, the LDH may comprise a surface-treating agent to then result in a layered double-hydroxide with the formula as below:

wherein M and M' are different and each is at least one metal cation, z=1 or 2; y=3 or 4, 0<x<0.9, b=0 to 10, c=0 to 10, 0<d≤10, X is an anion, n is the charge on the anion, and a=z(1−x)+xy−2; solvent is organic solvent with a hydrogen bond donor or acceptor function.

The surface-treating agent is an organic moiety capable of covalent or ionic association with at least one surface of the layered double hydroxide, and which modifies the surface properties of the layered double hydroxide. It will be appreciated that the at least one surface of the LDH may be external or internal (i.e. the surface-treating agent may be intercalated between the cationic layers). The surface-treating agent may be ionically associated with the surface of the LDH via a polar or charged group located on the surface-treating agent. Alternatively, the surface-treating agent may be covalently bonded to the surface of the LDH, for example to one or more hydroxyl groups located on the LDH's surface. Suitably, the surface-treating agent is covalently or ionically associated with at least one surface of the layered double hydroxide. In an embodiment, the surface-treating agent is an organic moiety comprising at least 4 carbon atoms and at least one functional group that is capable of covalent or ionic association with at least one surface of the layered double hydroxide. In another embodiment, the surface-treating agent is an organosilane compound, a surfactant or a mixture thereof. Alternatively, the surface-treating agent may be citric acid, or a salt thereof (e.g. sodium citrate). The organosilane compound may be a hydroxysilane, an alkoxysilane, siloxane, or polysiloxanes (e.g. polydimethylsiloxane). In an embodiment, the organosilane compound is selected from the group consisting of 3-aminopropyltriethoxysilane, (3-glycidyloxypropyl)triethoxysilane (3-mercaptopropyl)triethoxysilane, triethoxyvinylsilane, triethoxyphenylsilane, trimethoxy(octadecyl)silane, vinyl-tris(2-methoxy-ethoxy)silane, g-methacryloxypropyltrimethoxysilane, g-aminopropyltrimethoxysilane, b(3,4-epxycryclohexyl)ethyltrimethoxysilane, g-glycidoxypropyltrimethoxysilane, g-mercaptopropyltrimethoxysilane, (3-aminopropyl)triethoxysilane, N-(3-triethoxysilylpropyl) ethylenediamine, 3-aminopropyl-methyl-diethoxysilane, vinyltrimethoxysilane, chlorotrimethylsilane, tert-butyldimethylsilyl chloride, trichlorovinylsilane, methyltrichlorosilane, 3-chloropropyl trimethoxysilane, chloromethyltrimethylsilane, diethoxydimethyl silane, propyltrimethoxysilane and γ-piperazinylpropylmethyldimethoxysilane. Suitably, the organosilane compound is selected from the group consisting of 3-aminopropyltriethoxysilane, (3-glycidyloxypropyl)triethoxysilane (3-mercaptopropyl)triethoxysilane. Triethoxyvinylsilane, trimethoxymethylsilane and triethoxyphenylsilane. When used herein in relation to the surface-treating agent, it will be understood that the term surfactant means any compound having a hydrophilic portion capable of ionic or covalent association with the surface of the LDH, and a lipophilic portion. In an embodiment, the surfactant is a cationic, anionic, non-ionic or amphoteric surfactant. Exemplary surfactants include sodium dodecyl sulphate and sodium dodecylbenzenesulfonate. In another embodiment, the surfactant is a fatty acid, preferably having 4-22 carbon atoms, or a salt thereof, a fatty acid/phosphoric acid ester, or polyhydric alcohol esters. Exemplary surfactants include butyric acid, caproic acid, lauric acid, myristic acid, palmitic acid, stearic acid, hydroxystearic acid, arachidic acid, oleic acid, linoleic acid, maleic acid, or a salt thereof. Suitably, the surfactant is selected from stearic acid, lauric acid, or a salt thereof (e.g. sodium salts, magnesium salts, calcium salts, zinc salts). Preferably, LDH is surface-treated with calcium stearate or zinc stearate. The surface treating agents attach to the surface of LDH for preventing moisture and/or volatile substance to absorb into the LDH structure and/or on the LDH surface during storage time.

In one embodiment, d has a value according to the expression 0.01<d≤5. Suitably, d has a value according to the expression 0.01<d≤3. d may also have a value according to the expression 0.1<d≤3 or 1<d≤3.

In further embodiment, the polymer composition may comprise a lubricant, a processing aid, a further flame retardant agent other than the LDH, a filler, a pigment (e.g. iron oxide pigment, carbon black), an antioxidant or a mixture thereof.

Lubricant may be selected from acid ides (e.g. erucamide, oleamide, stearamide), acid esters (e.g. stearyl stearate, distearyl phthalate), fatty acids (e.g. lauric, myristic, palmitic, stearic), oleic, erucic), hydrocarbon waxes (e.g. polyethylene, polypropylene, paraffin), metallic soaps (e.g. calcium stearate, zinc stearate, magnesium stearate) or the mixtures thereof.

Processing aid may be selected from acrylic-based processing aids, fluoropolymers, silicone process aid or the mixtures thereof.

Flame retardant agent may be selected from organic phosphorus compounds (e.g. phosphates, phosphonates), halogenated flame retardant (e.g. brominated flame retardant), antimony trioxide, silicon dioxide, organically cationic clay, hydrated minerals such as hydroxides, hydrated oxides, or hydrated salts of metals (e.g. alumina trihydrate (ATH), magnesium dihydroxide (MDH)), or the mixtures thereof.

Filler may be selected from calcium carbonate, silica, barites, talc, mica, magnesium carbonate or silica.

In one embodiment, the polymer composition comprises PVC 100 parts by weight, plasticizer 10-70 parts by weight, stabilizer 3-7 parts by weight, lubricant 0.1-1 parts by weight, filler 0-80 parts by weight, processing aid 0-3 parts by weight, the LDH 3-10 parts by weight, pigment 0-2 parts by weight and other flame retardant 0-10 parts by weight.

In one embodiment, the polymer composition comprises PVC 100 parts by weight, phthalate plasticizer 10-35 parts by weight, mellitate plasticizer 5-30 parts by weight, lead-based stabilizer 3-7 parts by weight, oxidized PE wax 0.1-1 parts by weight, calcium carbonate 20-70 parts by weight, acrylic processing aid 0-3 parts by weight, the LDH 3-10 parts by weight, pigment 0-2 parts by weight and other flame retardant 0-10 parts by weight.

In one embodiment, the polymer composition is compounded by melt mixing process at high temperature, preferably 150-190° C., more preferably 160-180° C. and processing speed in the range of 30-100 rpm, preferably 40-60 rpm. The melt mixing process, for example, is single screw extrusion process, twin screw extrusion process or injection process.

According to the invention is also an article comprising the inventive polymer composition, wherein the article is an electric or electronic circuit component, a structural element for transportation and building or an indoor every day object.

Finally, according to the invention is also an electrical wire or cable coated with the polymer composition according to the invention.

It was surprisingly found that the polymer composition of the present invention provides excellent flame retardant properties as well as improved color stability and mechanical properties. Additionally, the polymer composition may be provided with superior flame retardancy properties although the flame retardant is added in low amounts. It was also surprisingly found that, in one embodiment, the color stability is better the higher Zn or Sn content in the LDH is. The polymer composition of the present invention also has a good, stable and transparent dispersion of LDH in polymer, reduction of plate-out formation (die buildup) in extrusion process, reduction of void or pinhole, and improvement of processability.

LDHs used in the polymer composition of the present invention may be $[(Mg_{0.33}Zn_{0.66})_{0.75}Al_{0.25}(OH)_2]$ $[CO_3]_{0.125}.bH2O.c(solvent)$, $[Zn_{0.67}Al_{0.33}(OH)_2]$ $[B_4O_7]_{0.17}.bH2O.c(solvent)$ or $[Mg_{0.75}(Al_{0.7}Sn_{0.3})_{0.25}(OH)_2][CO_3]_{0.16}.bH2O.c(solvent)$. Especially these compounds show best results regarding color stability, require only low dosage to be active as a flame retardant, show better flame retardancy performance and higher thermal stability, compared to flame retardants of the art.

The LDH can be prepared based on methods as known in the art. For example, a method is disclosed in WO 2015/144778 A1 and comprises the steps:
a) precipitating a layered double hydroxide having the formula
 $[M^{z+}_{1-x}M'^{y+}_x(OH)_2]^{a+}(X^{n-})_{a/n}.bH_2O$ wherein M, M', z, y, x, a, b and X are as defined above for formula (I) from a solution containing the cations of the metals M and M' and the anion $X^{n-}$;
b) aging the layered double hydroxide precipitate obtained in step a) in the original solution;
c) collecting, then washing the layered double hydroxide precipitate;
d) dispersing the wet layered double hydroxide in a solvent so as to produce a slurry of the layered double hydroxide in the solvent;
e) maintaining the dispersion obtained in step d);
f) optionally, dispersing in surface-treating agent;
g) optionally, maintaining the dispersion obtained in step f)
h) recovering and drying the layered double hydroxide; and
i) optionally, thermal treating the layered double hydroxide obtained in step h)

In step a) of the above method, the layered double hydroxide will typically be produced by adding an aqueous precursor solution containing ions of the metals M and M' into a solution containing the anion X which may additionally contain NaOH or to which NaOH solution may be added separately in order to adjust the pH of the solution to a predetermined value, typically greater than 7, preferably greater than 8, more preferably 9-10. It is, according to a preferred embodiment, desirable to add the metal precursor solution to the anion solution rapidly with vigorous stirring since this promotes rapid nucleation of the LDH. In one embodiment, a loading rate of the aqueous precursor into a solution containing the anion X is greater than 1,200 ml/minute, preferably greater than 1,400 ml/minute, more preferably in the range of 1,400-1,600 ml/min. In another embodiment, a speed for stirring is greater than 300 rpm, preferably greater than 400 rpm, more preferably 500-800 rpm. We have found that this rapid addition and quick co-precipitation stage causes the LDH colloid formed to have a smaller and thinner particle size. The LDH is subjected to aging in the original reaction solution and, preferably, the solution containing the precipitated LDH will be aged for less than 12 hours, preferably 1-5 hours and more preferably 3-4 hours. In step c) of the method, the precipitated layered double hydroxide is collected and then washed. Typically, the precipitate is collected by filtration, preferably vacuum filtration. After collection, the precipitate is washed until the washing solution has a pH which is subs daily neutral, for example pH 7±0.5. Washing is typically carried out using deionised water.

According to the above method, the collected and washed LDH is re-dispersed in the solvent so as to produce a slurry of the LDH in the solvent. Preferably, solvent is ethanol.

The dispersion of LDH in the solvent is maintained preferably in the range of 30 minutes to 2 hours, preferably 1 to 2 hours, it is preferred that the dispersion is maintained under agitation and/or stirring. Stirring can be carried out using an overhead mixer at a stirring speed which is preferably at least 300 rpm and more preferably 500-800 rpm.

In further embodiment, the step f) may be conducted by a variety of means. In its simplest form, step f) comprises mixing the LDH provided in step e) with the surface-treating agent. In another embodiment, the LDH provided in step e) is calcined before mixing with the surface-treating agent in step f).

According to one preferred embodiment, the step h) of recovering and drying the LDH comprises filtering the LDH from the organic solvent and then subjecting the collected LDH to drying. Drying may be carried out in an oven, with or without applied vacuum for 8-16 hours. Typically, oven drying will be carried out at a relatively low temperature which will be dependent on the temperature at which the organic solvent evaporates. Preferably, the drying step, when the solvent is ethanol, will be carried out at a temperature in the range of room temperature (20° C.) to 70° C. In the preferred embodiment according to which ethanol is used as the organic solvent, we have found that an oven temperature of about 65° C. for overnight may be used to dry the collected LDH.

According to a different preferred embodiment, the step h) of the method comprises passing the dispersion of LDH in the organic solvent to a spray drying apparatus and then spray drying the dispersion, typically using an inert atmosphere such as nitrogen, so as to produce a spray dried LDH.

According to one preferred embodiment, the step i) of thermal treating the LDH comprises heating the LDH to evaporate solvent and water. The thermally treated LDH may have the amount of solvent in a range of 0-5,000 mg/kg of total mass of LDH, preferably 0-50 mg/kg of total mass of LDH, more preferably 0-10 mg/kg of total mass of LDH. Thermal treating may be carried out in an oven, vacuum oven, and/or disc dryer. Preferably, the thermal treating step, when the solvent is ethanol, will be carried out at a temperature 100° C. to 110° C.

Further features and advantages of the present invention will now be illustrated in the following detailed description by means of examples and is further illustrated by the drawings.

The abbreviations used in the below examples and tables have the following meanings LDH-CO$_3$: LDH having the formula (I) whereas the anion (X$^{n-}$) is carbonate LDH-B$_4$O$_7$: LDH having the formula (I) whereas the anion (X$^{n-}$) is borate Mg$_3$Al—CO$_3$: [(Mg$_{0.75}$Al$_{0.25}$(OH)$_2$][CO$_3$]$_{0.5}$·nH$_2$O; common Hydrotalcite without solvent treatment Mg$_{2.5}$Zn$_{0.5}$Al—CO$_3$: [(Mg$_{0.83}$Zn$_{0.17}$)$_{0.75}$Al$_{0.25}$(OH)$_2$][CO$_3$]$_{0.125}$·bH$_2$O·c(solvent)

Mg$_2$ZnAl—CO$_3$: [(Mg$_{0.66}$Zn$_{0.33}$)$_{0.75}$Al$_{0.25}$(OH)$_2$][CO$_3$]$_{0.125}$·bH$_2$O·c(solvent)

Mg$_{1.5}$Zn$_{1.5}$Al—CO$_3$: [(Mg$_{0.5}$Zn$_{0.5}$)$_{0.75}$Al$_{0.25}$(OH)$_2$][CO$_3$]$_{0.125}$·bH$_2$O·c(solvent)

MgZn$_2$Al—CO$_3$: [(Mg$_{0.33}$Zn$_{0.66}$)$_{0.75}$Al$_{0.25}$(OH)$_2$][CO$_3$]$_{0.125}$·bH$_2$O·c(solvent)

Mg$_3$Al$_{0.7}$Sn$_{0.3}$—CO$_3$: [(Mg)$_{0.75}$(Al$_{0.7}$Sn$_{0.3}$)$_{0.25}$(OH)$_2$][CO$_3$]$_{0.16}$·bH$_2$O·c(solvent)

Zn$_2$Al—B$_4$O$_7$: [(Zn)$_{0.67}$(Al)$_{0.33}$(OH)$_2$][B$_4$O$_7$]$_{0.17}$·bH$_2$O·c(solvent)

ATH: Aluminium trihydrate

Synthesis of LDHs of the Invention

Synthesis of LDH-CO$_3$ (LDH-C 1 to 5)

LDH-C 1 to 5 were synthesized by adding a metal precursor solution drop-wise into 1.4 L of a 1.5 M Na$_2$CO$_3$ solution with a drop rate of 36 ml/minute. The pH of the precipitation solution was controlled at 10 using a NaOH solution (12M). After 4 hours of aging in original solution, the resulting slurry was filtered by vacuum filtration technique and washed with deionized water until a pH is 7 was obtained. The filtered slurry was washed with ethanol for 1 hour, and then was dried by vacuum oven at 65° C. overnight. The metal precursor solution were prepared by dissolving metals as stated in Table 1 in 1.4 L water.

TABLE 1

| | LDH-C 1<br>Mg$_{2.5}$Zn$_{0.5}$Al—CO$_3$ | LDH-C 2<br>Mg$_2$ZnAl—CO$_3$ | LDH-C3<br>Mg$_{1.5}$Zn$_{1.5}$Al—CO$_3$ | LDH-C 4<br>MgZn$_2$Al—CO$_3$ | LDH-C 5<br>Mg$_3$Al$_{0.7}$Sn$_{0.3}$—CO$_3$ |
|---|---|---|---|---|---|
| | | | Metal precursor solution | | |
| Zn(NO$_3$)$_2$·6H$_2$O (kg) | 0.094 | 0.189 | 0.283 | 0.379 | — |
| Mg(NO$_3$)$_2$·6H$_2$O (kg) | 0.407 | 0.326 | 0.244 | 0.163 | 0.490 |
| Al(NO$_3$)$_3$·9H$_2$O (kg) | 0.239 | 0.239 | 0.239 | 0.239 | 0.168 |
| SnCl$_4$·5H$_2$O (kg) | — | — | — | — | 0.050 |

Synthesis of Zn$_2$Al—B$_4$O$_7$ (LDH-B 1)

LDH-B 1 was synthesized by adding a metal precursor solution drop-wise into a 1.4 L of 1.5 M Na$_2$B$_4$O$_7$ solution with a drop rate of 36 ml/minute. The pH of the precipitation solution was controlled at 9 using a NaOH solution (12M). After 4 hours of aging in original solution, the resulting slurry was filtered by vacuum filtration technique and washed with deionized water until a pH is 7 was obtained. The filtered slurry was washed with ethanol for 1 hour, and then was dried by vacuum oven at 65° C. overnight. The metal precursor solution was prepared by mixing 379.3 g of Zn(NO$_3$)$_2$.6H$_2$O, 239.1 g of Al(NO$_3$)$_3$.9H$_2$O in 1.4 L of water.

Characterisation Methods a) Color stability of prepared LDHs filled PVC compositions was evaluated after extrusion by eyes and by spectrophotometer CM-3600A (Konica Minolta). LDH filled PVC compositions were compression molded into 11×11 cm$^2$ square plaques of uniform thickness (approximately 3 mm.) for measurement whiteness index (WI), yellowness index (YI), L*, a*, b*, C, h and delta E by spectrophotometer.

b) Determination of physical properties of the polymer composites

1. Tensile strength and % Elongation is measured by IEC60502. The specimen in dumbbell shape is extended at the cross head speed of 200 mm/min by using the test machine U.T.M. The breaking point is measured. Tensile strength and elongation are calculated by the following formula.

$$\text{Tensile strength}\left(\frac{\text{kfg}}{\text{mm}^2}\right) = \frac{\text{Load value (kgf)}}{\text{Width (mm)} \times \text{Thickness (mm)}}$$

$$\% \text{ Elongation} = \frac{\text{Extension}}{\text{Primary length}} \times 100$$

2. Tensile strength and % Elongation after heat aging is measured by IEC60502. The specimen in dumbbell shape is heated at 100° C. for 168 hours before extended at the cross head speed of 200 mm/min by using the test machine U.T.M. The breaking point is measured. Retention of tensile strength and elongation at break are calculated by the following formula.

$$\% \text{ Retention of tensile strenght} = \frac{\text{Tensile strength after aging}}{\text{Tensile strength before aging}} \times 100$$

$$\% \text{ Retention of elongation} = \frac{\text{Elongation after aging}}{\text{Elongation before aging}} \times 100$$

3. Tensile strength and % Elongation after oil aging is measured by 902. The specimen in dumbbell shape is heated in oil at 70° C. for 4 hours before extended at the cross head speed of 200 mm/min by using the test machine U.T.M. The breaking point is measured. Retention of tensile strew and elongation at break are calculated by the formula as shown in 2.

c) Flame-retardant performance of prepared LDHs filled PVC compositions was evaluated using a cone calorimetry (Toyoseiki). Approximately 30 g of PVC composition was compression molded into 10 cm×10 cm square plaques of uniform thickness (approximately 3 mm.) before the tests were performed. A cone-shape heater with incident flux of 50 kW/m2 was used, and the spark was continuous until the sample ignited. The results from cone calorimeter are generally considered to be reproducible to +/−10%. This provides the peak heat release rate (PHRR) and ignition time. The fire performance index (FPI) which is the ratio between the ignition time and the peak rate of heat release.

d) Congo red test of prepared LDH filled PVC compositions was evaluated by putting 1-g sample into the test tube which will be placed in the heating block at 180° C. Litmus paper will be placed at the top of the tube. Once the paper turns red, the time is recorded indicating the emission of acid gas from the composition.

e) Smoke density test is measured by ASTM E 662. Sample was prepared into 3×3 inches with 3 mm thickness. The test was performed with non-flaming mode where the sample was radiated with heat source (2.5 W/cm$^2$). As smoke generated, optical transmission was measured. The specific optical density (Ds) is then calculated and plotted against time.

EXAMPLE 1

PVC compositions, Comparative example 1-7 (Com.Ex. 1-7) and Embodiment 1-14 (Em. 1-14), were prepared by dry blending 100 parts by weight of PVC resin, 4 parts by weight of tribasic lead sulphate, 20 parts by weight of 1,2-benzenedicarboxylic acid diisodecyl ester, 10 parts by weight of tris(2-ethylhexyl) trimellitate, 5 parts by weight of chlorinated paraffin oil, 5 parts by weight of epoxidized soybean oil, 50 parts by weight of $CaCO_3$, 0.2 parts by weight of epoxidized PE wax, 3 parts by weight of antimony trioxide, 2 parts by weight of silicon dioxide, 1 parts by weight of acrylic processing aid, and the prepared LDH-$CO_3$, the prepared LDH-$B_4O_7$, common hydrotalcite ($Mg_3Al$—$CO_3$) or ATH in an count as dictated in table 2 and 3M high speed mixer at 500-2,000 rpm and heat up to 120° C. to produce a uniform powder mixture. Then, melt mixing the dry blend by single screw extruder at a temperature of 160-180° C. with a screw speed of 60 rpm to form LDHs filled PVC pellet. The prepared composition have been tested and analyzed, the results are given in Table 2 and 3 below.

TABLE 2

Color stability of polymer composition prepared with LDHs having various metal types

| | Com. Ex 1 | Com. Ex 2 | Em. 1 | Em. 2 | Em. 3 | Em. 4 | Em. 5 | Em. 6 |
|---|---|---|---|---|---|---|---|---|
| LDHs (parts by weight) | | | | | | | | |
| LDH-C1 | — | — | 30 | | | | | |
| LDH-C2 | — | — | | 30 | | | | |
| LDH-C3 | — | — | | | 30 | | | |
| LDH-C4 | — | — | | | | 30 | | |
| LDH-C5 | — | — | | | | | 30 | |
| LDH-B1 | — | — | | | | | | 30 |
| $Mg_3Al$—$CO_3$ | — | 30 | | | | | | |
| Color stability | | | | | | | | |
| Color by eye | White | Black | Dark brown | Brown | Yellow | Quite white | Quite white | Quite white |
| WI | 40.73 | −39.67 | −129.1 | −103.1 | −27.28 | 43.84 | −25.62 | 25.77 |
| YI | 4.85 | 40.75 | 75.66 | 59.94 | 33.69 | 6.65 | 31.83 | 12.92 |
| L* | 78.56 | 67.38 | 52.78 | 49.24 | 70.76 | 80.8 | 70.77 | 78.34 |
| a* | −0.85 | 9.37 | 14.34 | 9.75 | 5.97 | 0.72 | 4.82 | 1.42 |
| b* | 2.51 | 13.15 | 22.08 | 16.47 | 12.15 | 2.76 | 11.82 | 5.28 |
| C | 2.65 | 16.14 | 26.33 | 19.14 | 13.54 | 2.85 | 12.76 | 5.47 |
| h | 108.64 | 54.51 | 57 | 59.36 | 63.85 | 75.27 | 67.79 | 74.91 |
| dE | — | 18.5 | 35.8 | 34.2 | 14.2 | 2.75 | 13.4 | 3.58 |

As table 2, for the inventive polymer compositions (Em.1-6), it was found in a preferred embodiment that an increase of Zn-content in the LDH and an incorporation of Sn(IV) in the LDH results in a less yellowing (browning) of the polymer/LDH composition after processing at high temperatures and pressures while common hydrotalcite, $Mg_3Al$—$CO_3$ (Com.Ex 2) provides a dark brown/black material after processing compared to the PVC composition without LDHs (Com.Ex 1).

TABLE 3

Mechanical and flame retardancy properties of PVC composition

| | | | Com. Ex 3 | Com. Ex 4 | Com. Ex 5 | Com. Ex 6 | Com. Ex 7 | Em. 7 | Em. 8 |
|---|---|---|---|---|---|---|---|---|---|
| Composition | Type | | ATH | | $Mg_3Al$—$CO_3$ | | | LDH-C 4 | |
| | parts by weight | | 30 | 3 | 5 | 7 | 10 | 3 | 5 |
| Property | Method | Spec | | | | | | | |
| Specific gravity | ASTM D 792 | — | 1.568 | 1.516 | 1.523 | 1.528 | 1.547 | 1.527 | 1.531 |
| Tensile strength, MPa | IEC 60502 | Min. 12.5 | 23.4 | 22.6 | 22.4 | 20.9 | 16.7 | 24.6 | 24.1 |
| Elongation at break, % | IEC 60502 | Min. 150 | 277 | 288 | 279 | 245 | 114 | 261 | 268 |
| After heat aging at 100° C., 168 h | Method | Spec | | | | | | | |

TABLE 3-continued

Mechanical and flame retardancy properties of PVC composition

| | | | | | | | | | |
|---|---|---|---|---|---|---|---|---|---|
| Tensile strength, MPa | IEC 60502 | Min. 12.5 | 21.7 | 21.8 | 21.3 | 19.7 | 20.1 | 22.6 | 22.3 |
| Elongation at break, % | IEC 60502 | Min. 150 | 254 | 250 | 245 | 200 | 5 | 274 | 269 |
| Retention of tensile strength, % | IEC 60502 | 75-125 | 93 | 96.4 | 95.2 | 94.1 | 120.5 | 92 | 93 |
| Retention of elongation at break, % | IEC 60502 | 75-125 | 92 | 86.8 | 87.9 | 81.5 | 4.4 | 105 | 100 |

| Flammability Behavior at 50 kW/m² | Method | Spec | | | | | | | |
|---|---|---|---|---|---|---|---|---|---|
| Ignition time (sec) | — | — | 46.2 | — | — | — | — | 20.3 | 160.9 |
| Peak heat release rate (kW/m²) | — | — | 160.23 | — | — | — | — | 127.67 | 118.39 |
| Fire performance index, s · m²/kW | — | — | 0.47 | 0.23 | 0.17 | 0.16 | 0.21 | 0.16 | 1.36 |
| Congo red (min) | — | min 120 | 503 | — | — | — | — | 450 | 373 |

| | | | Em. 9 | Em. 10 | Em. 11 | Em. 12 | Em. 13 | Em. 14 |
|---|---|---|---|---|---|---|---|---|
| Composition | Type | | LDH-C 4 | | | LDH-B 1 | | |
| | parts by weight | | 7 | 10 | 3 | 5 | 7 | 10 |
| Property | Method | Spec | | | | | | |
| Specific gravity | ASTM D 792 | — | 1.536 | 1.548 | 1.518 | 1.518 | 1.513 | 1.516 |
| Tensile strength, MPa | IEC 60502 | Min. 12.5 | 25.3 | 24.4 | 23.5 | 23.3 | 23.8 | 22.7 |
| Elongation at break, % | IEC 60502 | Min. 150 | 305 | 302 | 271 | 261 | 266 | 249 |
| After heat aging at 100° C., 168 h | Method | Spec | | | | | | |
| Tensile strength, MPa | IEC 60502 | Min. 12.5 | 22.6 | 22.9 | 22.8 | 22.3 | 22.7 | 21.6 |
| Elongation at break, % | IEC 60502 | Min. 150 | 265 | 251 | 225 | 253 | 248 | 233 |
| Retention of tensile strength, % | IEC 60502 | 75-125 | 89 | 94 | 91.7 | 97.5 | 93.8 | 100.0 |
| Retention of elongation at break, % | IEC 60502 | 75-125 | 87 | 83 | 83.1 | 96.9 | 93.0 | 93.6 |
| Flammability Behavior at 50 kW/m² | Method | Spec | | | | | | |
| Ignition time (sec) | — | — | 351.6 | 410.9 | 78.1 | 136.2 | 286.3 | 61.5 |
| Peak heat release rate (kW/m²) | — | — | 104.31 | 95.50 | 138.49 | 130.30 | 113.54 | 22.24 |
| Fire performance index, s · m²/kW | — | — | 3.37 | 3.58 | 0.56 | 1.05 | 2.52 | 6.71 |
| Congo red (min) | — | min 120 | 355 | 380 | 375 | 350 | 340 | 305 |

As table 3, the use of the LDHs (Em. 7 to 14) prolongs ignition time and decreases peak heat release rate (PHRR). The fire performance index (FPI) is a correlation to time to flashover of a material under burning situation. Consequently, FPI can be used to predict time available for escape. Therefore, the higher the index, the better the material is in term of flame retardancy. For both LDH systems LDH-CO₃ (Em. 7 to 10), and LDH-B₄O₇ (Em. 11 to 14), only 5-10 parts by weight additions are needed in order to get over 100% improvement in FPI compared with 30 parts by weight addition of ATH for existing PVC formulations (Com. Ex 3). In addition, the common hydrotalcite (Com. Ex 4 to 7) shows worse FPI, tensile strength and elongation at break compared to the LDHs at the same amount of addition.

It was also found that the use of the LDH allows a reduction of the amount of the LDH compared to the use of, for example, ATH in the composite to nevertheless provide improved flame retardant properties. For example, better flame retardant properties may be obtained for the LDH of the present invention using 5 or 7 or 10 parts by weight compared to the use of 30 parts by weight of ATH.

In addition, it was also found that the use of the LDH lessen the Congo red value. The Congo red test is used for evaluating the dehydrochlorination rate which is the rate of HCl release from the heating of PVC composition pellet. The released HCl accelerates the PVC degradation which eventually generates crosslinked material. This crosslinked material can also act as bather to retard flame spread. In PVC/LDH, the better flame retarding performance can then be related to the lower the Congo Red value as faster barrier formation to better protect flame spread. However, the lower the Congo Red value does not affect to the processing because the Congo Red value is still longer than the resident time of material during processing.

EXAMPLE 2

Figure 1:
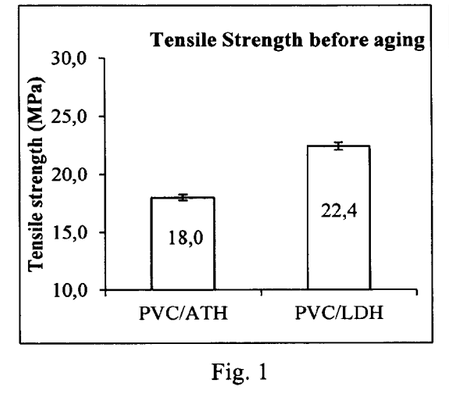
FIG. 1 illustrates the tensile strength before aging of polymer compositions prepared according to Example 2.
Figure 2:
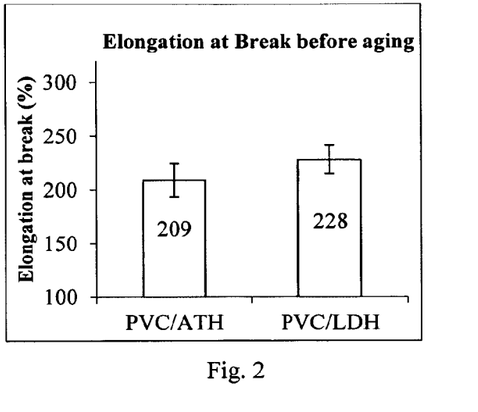
FIG. 2 illustrates the elongation at break before aging of polymer compositions prepared according to Example 2.
Figure 3:
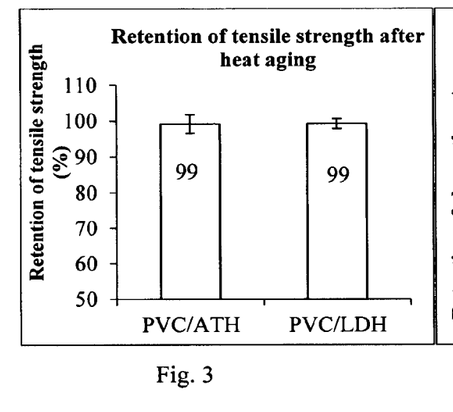
FIG. 3 illustrates the retention of tensile strength after heat aging of polymer compositions prepared according to Example 2.
Figure 4:
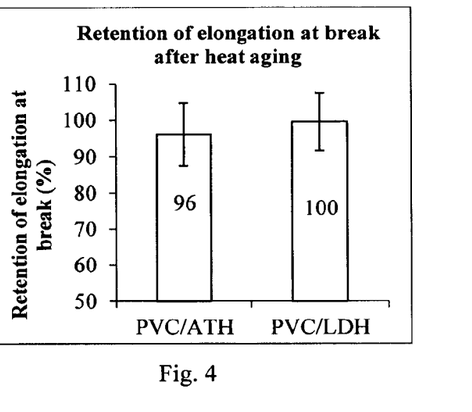
FIG. 4 illustrates the elongation at break after heat aging for polymer compositions prepared according to Example 2.
Figure 5:
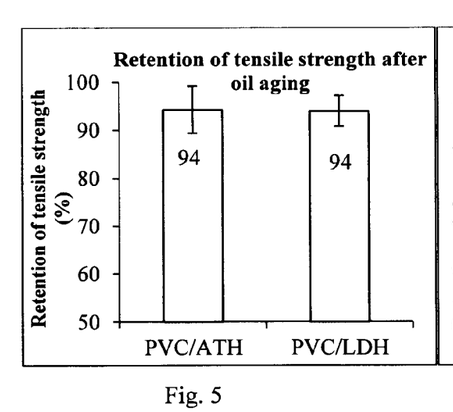
FIG. 5 illustrates the retention of tensile strength after oil aging of polymer compositions prepared according to Example 2.
Figure 6:
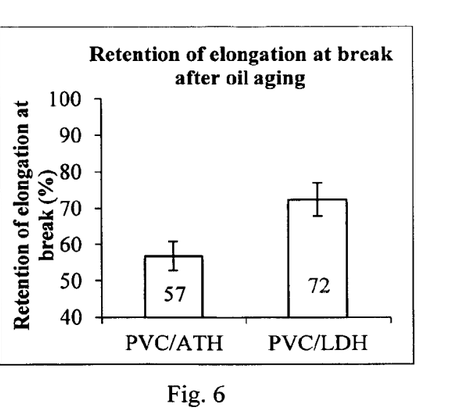
FIG. 6 illustrates the retention of elongation at break after oil aging for polymer compositions prepared according to Example 2.
Figure 7:
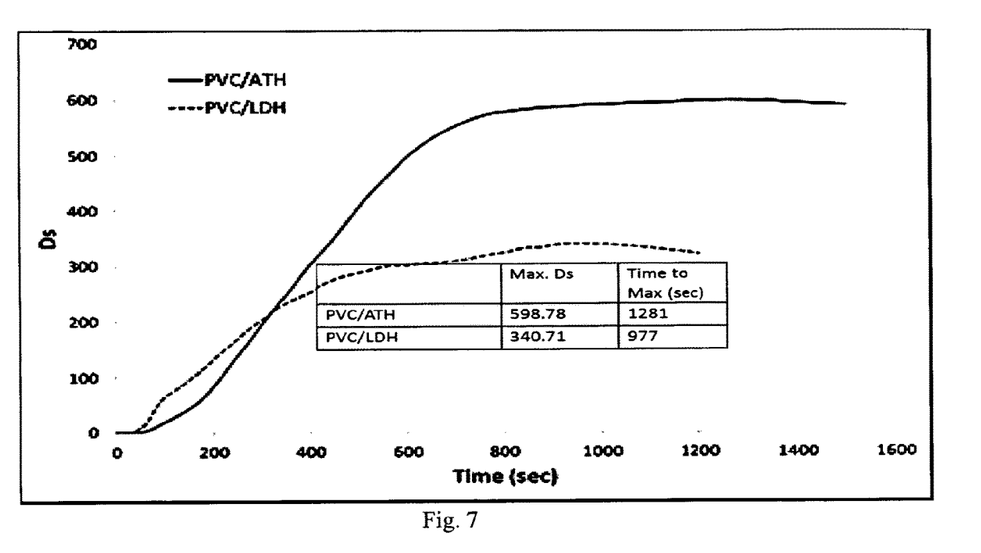
FIG. 7 illustrates the smoke density of PVC compositions prepared according to Example 2.

PVC compositions, PVC/ATH and PVC/LDH, were prepared by dry blending 100 parts by weight of PVC resin, 4 parts by weight of tribasic lead sulphate, 20 parts by weight of 1,2-benzenedicarboxylic acid diisodecyl ester, 10 parts by weight of tris(2-ethylhexyl) trimellitate, 5 parts by weight of chlorinated paraffin oil, 5 parts by weight of epoxidized soybean oil, 50 parts by weight of CaCO3, 0.2 parts by weight of epoxidized PE wax, 3 parts by weight of antimony trioxide, 2 parts by weight of silicon dioxide, 1 parts by weight of acrylic processing aid, 0.8 parts by weight of carbon black, and 30 parts by weight of ATH or 7 parts by weight of the prepared MgZn₂Al—CO₃, in high speed mixer at 500-2,000 rpm and heat up to 120° C. to produce a uniform powder mixture. Then, melt mixing the dry blend by single screw extruder at a temperature of 160-180° C. with a screw speed of 60 rpm to form LDHs filled PVC pellet. The prepared composition have been tested and analyzed, the results are given in FIGS. 1 to 7.

As FIGS. 1 to 7, the addition of the LDHs reduces smoke generation as compared with the ATH-filled PVC composition. In addition, the PVC/LDH shows better mechanical performance than that of PVC/A system.

The features disclosed in the foregoing description and in the claims may, both separately and in any combination be material for realizing the invention in diverse forms thereof.

The invention claimed is:

1. A polymer composition comprising
100 parts by weight of halogen containing polymer,
10 to 70 parts by weight of plasticizer,
2 to 10 parts by weight of stabilizer,
1-15 parts by weight of a layered double hydroxide (LDH) having the formula $$[(Mg_pZn_qSn^{(II)}_r)_{1-x}(Al_sSn^{(IV)}_t)_x(OH)_2]^{a+}(X^{n-})_{a/n}\cdot bH_2O\cdot c(\text{solvent})$$

wherein p+q+r=1, p=0 to 0.33, q=0.67 to 1, r=0-1, s+t=1, s=0-1, t=0-1, x=0.10-0.40, b=0 to 10, c=0 to 1, X is an anion, n is the charge on the anion, and a=[(2p+2q+2r)(1−x)]+[(3s+4t)x]−2; solvent is organic solvent with a hydrogen bond donor or acceptor function.

2. The polymer composition according to claim 1, wherein the LDH has the formula $$[(Mg_pZn_q)_{1-x}Al_x(OH)_2]^{a+}(X^{n-})_{a/n}\cdot bH_2O\cdot c(\text{solvent})$$

wherein p+q=1, p=0 to 0.33, q=0.67 to 1, x=0.10-0.40, b=0 to 10, c=0 to 1, X is an inorganic oxyanion, n is the charge on the anion, and a=[(2p+2q)(1−x)]+3x−2; solvent is ethanol.

3. The polymer composition according to claim 1, wherein X is an anion selected from at least one of halide, inorganic oxyanion, anionic surfactants, anionic chromophores, and anionic UV absorbers.

4. The polymer composition of claim 3, wherein the inorganic oxyanion is selected from the group consisting of carbonate, bicarbonate, hydrogenphosphate, dihydrogenphosphate, nitrite, borate, nitrate, sulphate, phosphate, and mixtures thereof.

5. The polymer composition according to claim 1, wherein the organic solvent with a hydrogen bond donor or acceptor function is selected from the group consisting of ethyl acetate, acetone, acetonitrile, dimethylformamide, dimethylsulfoxide, dioxane, ethanol, m-cresol, o-cresol, p-cresol, methanol, n-propanol, isopropanol, n-butanol, sec-butanol, n-pentanol, n-hexanol, cyclohexanol, diethyl ether, diisopropyl ether, di-n-butyl ether, methyl tert-butyl ether (MTBE), tert-amyl methyl ether, cyclopentyl methyl ether, anisole, butyl carbitol acetate, cyclohexanone, methyl ethyl ketone (MEK), methyl isobutyl ketone (MIBK), methyl isoamyl ketone, methyl n-amyl ketone, isophorone, isobutyraldehyde, furfural, methyl formate, methyl acetate, isopropyl acetate, n-propyl acetate, isobutyl acetate, n-butyl acetate, n-amyl acetate, n-hexyl acetate, methyl amyl acetate, methoxypropyl acetate, 2-ethoxyethyl acetate, 2-butoxyethyl acetate, n-butyl propionate, n-pentyl propionate, triethylamine, 2-nitropropane, aniline, N,N-dimethylaniline, nitromethane, tetrahydrofurane, and mixtures of two or more thereof.

6. The polymer composition according to claim 1, wherein the LDH as defined in formula (1) has b+c in the range of 0-1.

7. The polymer composition according to claim 1, wherein the plasticizer comprises at least one plasticizer selected from the group of phthalate, mellitate, adipate, azelate, maleate, sebacate, epoxidized oil, chlorinated paraffin oil, polymeric plasticizer or a mixture thereof.

8. The polymer composition according to claim 1, wherein the stabilizer comprises at least one stabilizer selected from the group of lead-based stabilizer, mixed metal-based stabilizer or a mixture thereof.

9. The polymer composition according to claim 1, wherein the LDH further comprising a surface-treating agent, said surface-treating agent is an organic moiety capable of covalent or ionic association with at least one surface of the layered double hydroxide, and which modifies the surface properties of the layered double hydroxide.

10. The polymer composition according to claim 9, wherein the surface-treating agent is an organic moiety comprising at least 4 carbon atoms and at least one functional group that is capable of covalent or ionic association with at least one surface of the layered double hydroxide.

11. The polymer composition of claim 10, wherein the surface-treating agent is selected from the group consisting of an organosilane compound, a fatty acid or a salt thereof, a fatty acid/phosphoric acid ester, a polyhydric alcohol ester, and mixtures thereof.

12. The polymer composition according to claim 1, wherein the polymer composition is compounded by an extrusion process at a high temperature and a screw speed in the range of 30-100 rpm.

13. The polymer composition of claim 12, wherein the temperature of the extrusion process is from 150° C. to 190° C.

14. The polymer composition of claim 13, wherein the temperature of the extrusion process is from 160° C. to 180° C.

15. The polymer composition of claim 12, wherein the screw speed of the extrusion process is from 40 rpm to 60 rpm.

16. An article comprising the polymer composition according to claim 1, wherein the article is an electric or electronic circuit component, a structural element for transportation and building or an indoor everyday object.

17. An electrical wire or cable coated with the polymer composition according to claim 1.

* * * * *